US012512039B2

(12) United States Patent
Lee

(10) Patent No.: US 12,512,039 B2
(45) Date of Patent: Dec. 30, 2025

(54) GATE DRIVER AND DISPLAY APPARATUS INCLUDING THE SAME

(71) Applicant: Samsung Display Co., LTD., Yongin-si (KR)

(72) Inventor: Gichang Lee, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/917,235

(22) Filed: Oct. 16, 2024

(65) Prior Publication Data

US 2025/0131868 A1 Apr. 24, 2025

(30) Foreign Application Priority Data

Oct. 18, 2023 (KR) ........................ 10-2023-0139803

(51) Int. Cl.
*G09G 3/3266* (2016.01)
*G09G 3/20* (2006.01)

(52) U.S. Cl.
CPC ... *G09G 3/2092* (2013.01); *G09G 2310/0267* (2013.01); *G09G 2310/0275* (2013.01); *G09G 2310/08* (2013.01)

(58) Field of Classification Search
CPC ........................... G09G 3/3266; G09G 3/3677
See application file for complete search history.

(56) References Cited

U.S. PATENT DOCUMENTS 11,308,888 B2 4/2022 Yuan et al.
11,587,512 B2 2/2023 Zhang et al.
2015/0287392 A1* 10/2015 Kim .................... G09G 3/3677 327/109
2017/0069282 A1* 3/2017 Park .................... G09G 3/3648
2019/0304377 A1* 10/2019 Lee ...................... G09G 3/3266

FOREIGN PATENT DOCUMENTS

CN 112951160 6/2021
KR 10-0747291 8/2007

* cited by examiner

*Primary Examiner* — Sepehr Azari
(74) *Attorney, Agent, or Firm* — Harness, Dickey & Pierce, P.L.C.

(57) ABSTRACT

A gate driver includes a first transistor including a control electrode, a first electrode receiving a previous signal and a second electrode electrically connected to a Q node, a second transistor including a control electrode electrically connected to the Q node, a first electrode receiving a first voltage and a second electrode electrically connected to a QB node, a third transistor including a control electrode electrically connected to the Q node, a first electrode electrically connected to the QB node and a second electrode receiving a second voltage, a fourth transistor including a control electrode electrically connected to the QB node, a first electrode receiving the first voltage and a second electrode electrically connected to a GO node and a fifth transistor including a control electrode electrically connected to the Q node, a first electrode electrically connected to the GO node and a second electrode receiving the second voltage.

20 Claims, 8 Drawing Sheets

GATE DRIVER AND DISPLAY APPARATUS INCLUDING THE SAME

CROSS-REFERENCE TO RELATED APPLICATION

This application claims priority to and the benefit of Korean Patent Application No. 10-2023-0139803 under 35 USC § 119, filed on Oct. 18, 2023 in the Korean Intellectual Property Office (KIPO), the contents of which are herein incorporated by reference in their entireties.

BACKGROUND

1. Technical Field

The disclosure herein relates to a gate driver and a display apparatus including the gate driver. More particularly, the disclosure herein relates to the gate driver that stably outputs a gate output signal.

2. Description of the Related Art

Generally, a display apparatus includes a display panel and a display panel driver. The display panel includes a plurality of gate lines, a plurality of data lines and a plurality of pixels. The display panel driver includes a gate driver providing gate signals to the gate lines, a data driver providing data voltages to the data lines and a driving controller controlling the gate driver and the data driver.

SUMMARY

Embodiments described hereinbelow provide a gate driver that stably outputs a gate output signal.

Embodiments described herein also provide a display apparatus that includes the gate driver.

In an embodiment of a gate driver, the gate driver includes a plurality of stages. At least one stage of the plurality of stages includes a first transistor including a control electrode configured to receive a clock signal, a first electrode configured to receive a previous stage gate output signal and a second electrode electrically connected to a Q node, a second transistor including a control electrode electrically connected to the Q node, a first electrode configured to receive a first power voltage and a second electrode electrically connected to a QB node, a third transistor including a control electrode electrically connected to the Q node, a first electrode electrically connected to the QB node and a second electrode configured to receive a second power voltage, a fourth transistor including a control electrode electrically connected to the QB node, a first electrode configured to receive the first power voltage and a second electrode electrically connected to a GO node outputting a gate output signal, a fifth transistor including a control electrode electrically connected to the Q node, a first electrode electrically connected to the GO node and a second electrode configured to receive the second power voltage, a sixth transistor including a first electrode electrically connected to the GO node and a second electrode configured to receive the second power voltage and a first capacitor including a first electrode configured to receive the first power voltage and a second electrode electrically connected to the QB node.

In an embodiment, the sixth transistor may be an N-type transistor. The fifth transistor may be a P-type transistor.

In an embodiment, the sixth transistor may further include a control electrode electrically connected to the QB node.

In an embodiment, a ratio of a channel width to a channel length of the fifth transistor may be different from a ratio of a channel width to a channel length of the sixth transistor.

In an embodiment, the channel length of the sixth transistor may be longer than the channel length of the fifth transistor.

In an embodiment, the channel width of the sixth transistor may be narrower than the channel width of the fifth transistor.

In an embodiment, in a case that the gate output signal may have a low voltage, a turned-on state of the sixth transistor may be maintained.

In an embodiment, the least one stage may further include a ninth transistor including a control electrode configured to receive an initialization signal, a first electrode configured to receive the first power voltage and a second electrode electrically connected to the Q node.

In an embodiment, the least one stage may further include a seventh transistor including a control electrode electrically connected to the Q node, a first electrode configured to receive a third power voltage and a second electrode electrically connected to an N node and an eighth transistor including a control electrode electrically connected to the Q node, a first electrode electrically connected to the N node and a second electrode configured to receive the second power voltage. The sixth transistor may further include a control electrode electrically connected to the N node.

In an embodiment, in a case that the gate output signal may have a low voltage, a turned-on state of the sixth transistor may be maintained.

In an embodiment, the third power voltage may be lower than the first power voltage.

In an embodiment, the least one stage may further include a ninth transistor including a control electrode configured to receive an initialization signal, a first electrode configured to receive the first power voltage and a second electrode electrically connected to the Q node.

In an embodiment of a gate driver according to, the gate driver includes a plurality of stages. At least one stage of the plurality of stages includes a first transistor configured to apply a previous stage gate output signal to a Q node in response to a clock signal, a second transistor configured to apply a first power voltage to a QB node in response to a voltage of the Q node, a third transistor configured to apply a second power voltage to the QB node in response to the voltage of the Q node, a fourth transistor configured to apply the first power voltage to a GO node in response to a voltage of the QB node, a fifth transistor configured to apply the second power voltage to the GO node in response to the voltage of the Q node and a sixth transistor configured to apply the second power voltage to the GO node. The least one stage outputs a voltage of the GO node as a gate output signal. The sixth transistor is an N-type transistor.

In an embodiment, the sixth transistor may apply the second power voltage to the GO node in response to the voltage of the QB node.

In an embodiment, a ratio of a channel width to a channel length of the fifth transistor may be different from a ratio of a channel width to a channel length of the sixth transistor.

In an embodiment, the least one stage may further include a seventh transistor configured to apply a third power voltage lower than the first power voltage to an N node in response to the voltage of the Q node and an eighth transistor configured to apply the second power voltage to the N node in response to the voltage of the Q node. The sixth transistor may apply the second power voltage to the GO node in response to a voltage of the N node.

In an embodiment, the least one stage may further include a ninth transistor configured to apply the first power voltage to the Q node in response to an initialization signal.

In an embodiment, in a case that the gate output signal may have a low voltage, a turned-on state of the sixth transistor is maintained.

In an embodiment of a display apparatus, the display apparatus includes a display panel, a gate driver configured to apply a gate output signal to a gate line of the display panel and including a plurality of stages and a data driver configured to apply a data voltage to a data line of the display panel. At least one stage of the plurality of stages includes a first transistor including a control electrode configured to receive a clock signal, a first electrode configured to receive a previous stage gate output signal and a second electrode electrically connected to a Q node, a second transistor including a control electrode electrically connected to the Q node, a first electrode configured to receive a first power voltage and a second electrode electrically connected to a QB node, a third transistor including a control electrode electrically connected to the Q node, a first electrode electrically connected to the QB node and a second electrode configured to receive a second power voltage, a fourth transistor including a control electrode electrically connected to the QB node, a first electrode configured to receive the first power voltage and a second electrode electrically connected to a GO node outputting the gate output signal, a fifth transistor including a control electrode electrically connected to the Q node, a first electrode electrically connected to the GO node and a second electrode configured to receive the second power voltage, a sixth transistor including a first electrode electrically connected to the GO node and a second electrode configured to receive the second power voltage and a first capacitor including a first electrode configured to receive the first power voltage and a second electrode electrically connected to the QB node. The sixth transistor is an N-type transistor.

In an embodiment, in a case that the gate output signal may have a low voltage, a turned-on state of the sixth transistor may be maintained.

According to the gate driver and the display apparatus including the gate driver, a pull down transistor of a pull downer included in the gate driver may be an N-type transistor, so that the gate output signal of the gate driver may be outputted stably not a voltage differ from a power voltage and a threshold voltage of the pull down transistor, but the power voltage.

Additionally, the pull down transistor is an N-type transistor, so that the gate output signal may be outputted stably as the power voltage in a case that the gate output signal has a low voltage in a low frame mode.

BRIEF DESCRIPTION OF THE DRAWINGS

The above and other features and advantages of the present inventive concept will become more apparent by describing in detailed embodiments thereof with reference to the accompanying drawings, whereby sizes, thicknesses, ratios, and dimensions of the elements may be exaggerated for ease of description and for clarify, whereby like reference numbers and/or like reference characters refer to like elements, throughout, and in which.

DETAILED DESCRIPTION OF THE EMBODIMENTS

Hereinafter, various embodiments will be described in more detail with reference to the accompanying drawings.

Figure 1:
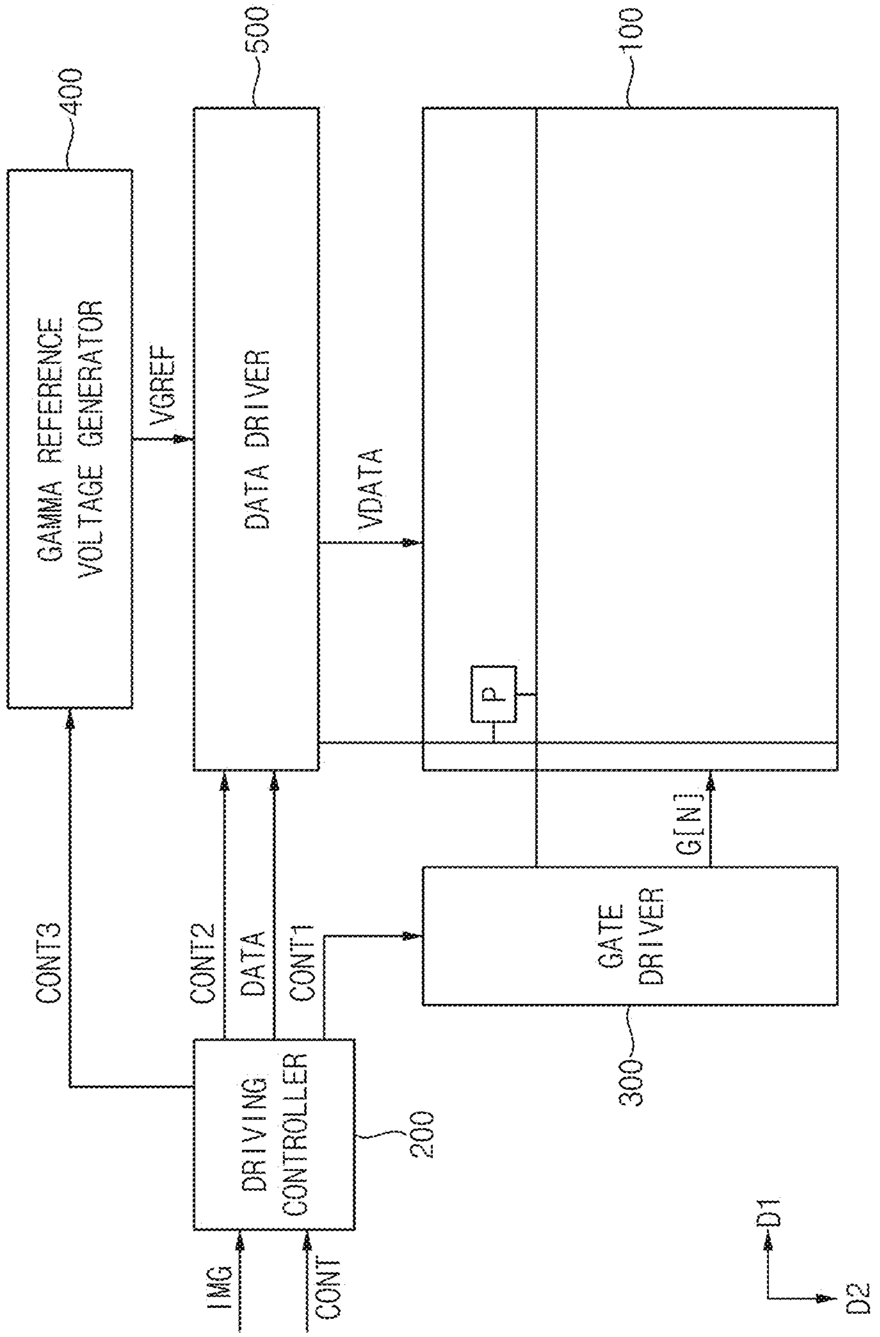
FIG. 1 is a block diagram illustrating a display apparatus according to an embodiment that is constructed according to principles of the invention.

FIG. 1 is a block diagram illustrating a display apparatus according to an embodiment that is constructed according to principles of the invention.

Referring to FIG. 1, the display apparatus includes a display panel 100 and a display panel driver. The display panel driver includes a driving controller 200, a gate driver 300, a gamma reference voltage generator 400 and a data driver 500.

The display panel 100 includes a display region configured to display an image and a peripheral region adjacent to the display region.

The display panel 100 includes a plurality of gate lines, a plurality of data lines and a pixel circuit P electrically connected to the gate lines and the data lines respectively. The gate lines may extend in a first direction D1 and the data lines may extend in a second direction D2 crossing the first direction D1.

The driving controller 200 receives an input image data IMG and an input control signal CONT from an external device. For example, the input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronization signal and a horizontal synchronization signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT and outputs the generated first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT and outputs the generated second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT and outputs the generated third control signal CONT3 to the gamma reference voltage generator 400.

The gate driver 300 generates a gate output signal G[N] for driving the gate line in response to the first control signal CONT1 received from the driving controller 200. The gate driver 300 may output the gate output signal G[N] to the gate lines.

In an embodiment, the gate driver 300 may be mounted on the peripheral region of the display panel 100. For example, the gate driver 300 may be integrated on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to each of the data signal DATA.

For example, the gamma reference voltage generator 400 may be disposed in the driving controller 200, or in the data driver 500.

The data driver 500 receives the second control signal CONT2 and the data signal DATA from the driving controller 200 and receives the gamma reference voltage VGREF from the gamma reference voltage generator 400. The data driver outputs a voltage data signal VDATA to the display panel 100.

In an embodiment, the data driver 500 may be mounted on the peripheral region of the display panel 100. For example, the data driver 500 may be integrated on the peripheral region of the display panel 100.

Figure 2:
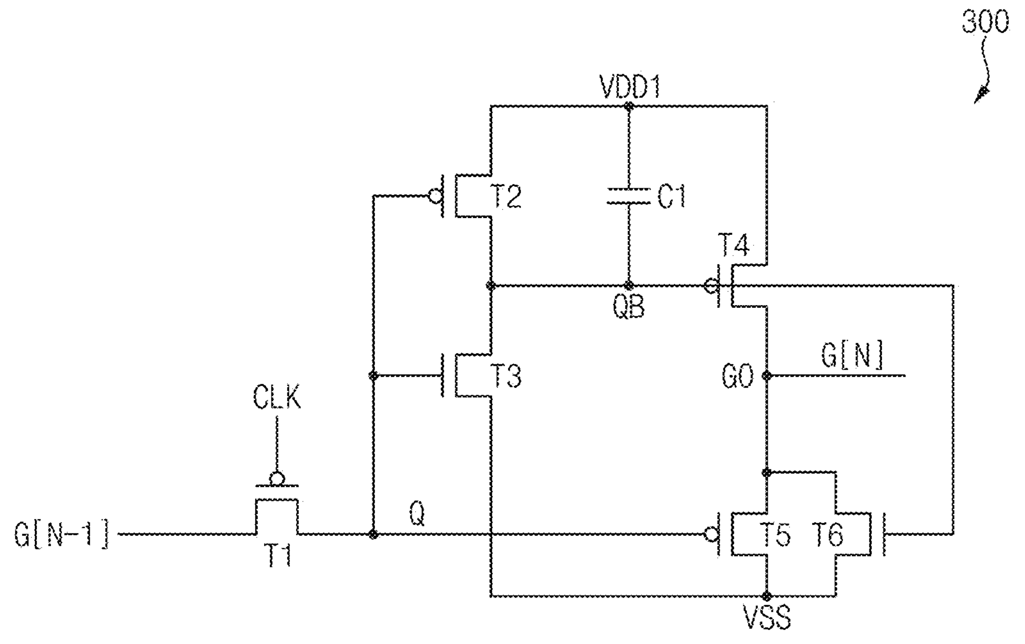
FIG. 2 is a circuit diagram illustrating a gate driver according to an embodiment.
Figure 3:
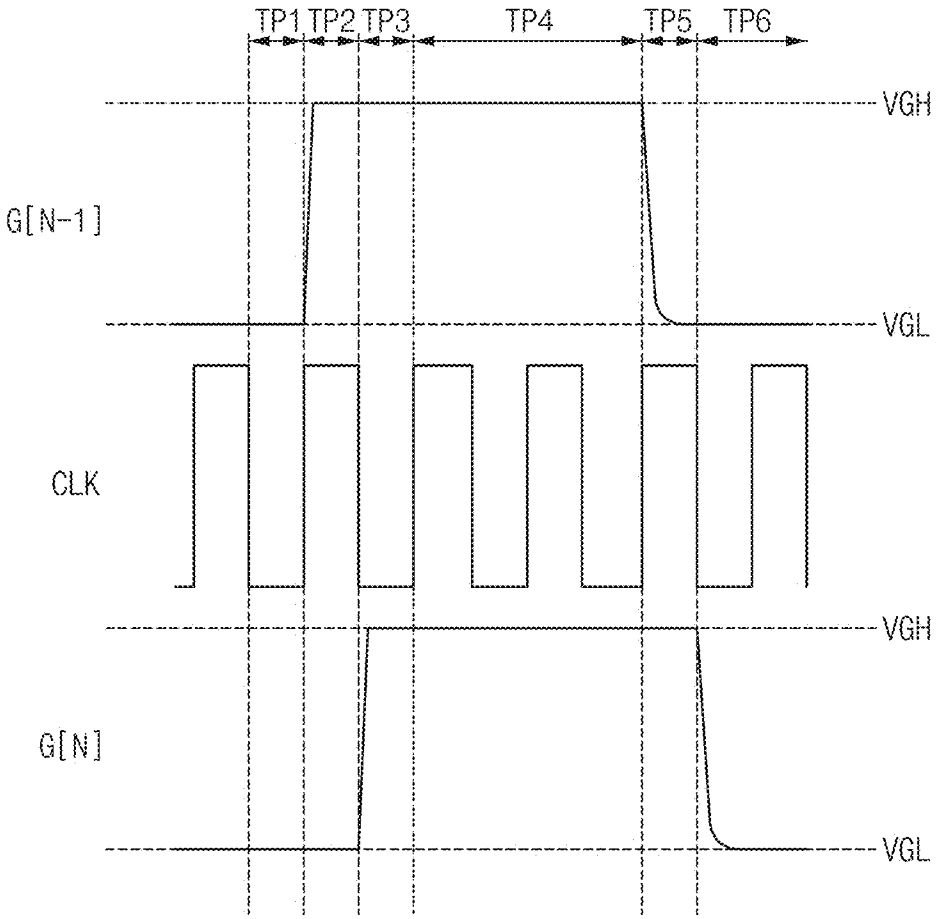
FIG. 3 is a timing diagram illustrating a gate output signal and input signals applied to a gate driver according to an embodiment.

FIG. 2 is a circuit diagram illustrating a gate driver 300 according to an embodiment. FIG. 3 is a timing diagram illustrating a gate output signal and input signals applied to a gate driver 300 according to an embodiment.

Referring to FIG. 2, in an embodiment, the gate driver 300 may include a plurality of stages. At least one of the stages may include a first transistor T1 that includes a control electrode receiving a clock signal CLK, a first electrode receiving a previous stage gate output signal G[N−1] and a second electrode connected to a Q node Q, a second transistor T2 that includes a control electrode connected to the Q node Q, a first electrode receiving a first power voltage VDD1 and a second electrode connected to a QB node QB, a third transistor T3 that includes a control electrode connected to the Q node Q, a first electrode connected to the QB node QB and a second electrode receiving a second power voltage VSS, a fourth transistor T4 that includes a control electrode connected to the QB node, a first electrode receiving the first power voltage and a second electrode connected to a GO node GO, a fifth transistor T5 that includes a control electrode connected to the Q node, a first electrode connected to the GO node GO and a second electrode receiving the second power voltage VSS, a sixth transistor T6 that includes a control electrode connected to the QB node QB, a first electrode connected to the GO node GO and a second electrode receiving the second power voltage VSS and a first capacitor Cl that includes a first electrode receiving the first power voltage VDD1 and a second electrode connected to the QB node QB. Additionally, the gate driver 300 may output a voltage of the GO node GO as the gate output signal G[N]. For example, the least one stage may have 6TIC structure that includes six transistors and one capacitor. In an embodiment, the first power voltage VDD1 may have a high voltage VGH. Additionally, in an embodiment, the second power voltage may have a low voltage VGL lower than the high voltage VGH. In an embodiment, the clock signal may periodically transition between the high voltage VGH and the low voltage VGL. However, the embodiment is not limited to a voltage level of the clock signal CLK. In an embodiment, the previous stage gate output signal G[N−1] may be the vertical start signal.

The first transistor T1 may apply the previous stage gate output signal G[N−1] to the Q node Q in response to the clock signal CLK. The second transistor T2 may apply the first power voltage VDD1 to the QB node QB in response to a voltage of the Q node Q. The third transistor T3 may apply the second power voltage VSS to the QB node QB in response to the voltage of the Q node Q. The fourth transistor T4 may apply the first power voltage VDD1 to the GO node GO in response to a voltage of the QB node QB. The fifth transistor T5 may apply the second power voltage VSS to the GO node GO in response to the voltage of the Q node. The sixth transistor T6 may apply the second power voltage VSS to the GO node GO.

In an embodiment, the first transistor T1, the second transistor T2, the fourth transistor T4 and the fifth transistor T5 may be P-type transistors. Additionally, in an embodiment, the third transistor T3 and the sixth transistor T6 may be N-type transistors.

A pull-down transistor of a conventional gate driver is P-type transistor, so that a gate output signal in which the conventional gate driver outputs a voltage increased by the threshold voltage of the pull-down transistor. In contrast, the gate driver 300 according an embodiment may include the sixth transistor T6. The sixth transistor T6 may be N-type transistor. The sixth transistor T6 may be N-type transistor, so that the gate output signal G[N] may not have voltage obtained by subtracting the threshold voltage of the sixth transistor T6 from the second power voltage VSS and may be stably outputted as the second power voltage VSS.

Referring to FIG. 2 and FIG. 3, a driving timing of the gate driver 300 may include a first period TP1, a second period TP2, a third period TP3, a fourth period TP4, a fifth period TP5 and a sixth period TP6.

In the first period TP1, the previous stage output signal G[N−1] may have the low voltage VGL and the clock signal CLK may have the low voltage VGL. In the first period TP1, the previous stage output signal G[N−1] having the low voltage VGL may applied to the Q node Q in response to the clock signal CLK having the low voltage VGL. Accordingly, the voltage of the Q node Q may be the low voltage VGL. In response to the voltage of the Q node Q, the second transistor T2 may be turned-on, the third transistor T3 may be turned-off and the fifth transistor T5 may be turned-on. The second transistor T2 may be turned-on, so that the first power voltage VDD1 may be applied to the QB node QB. In response to the voltage of the QB node QB, the fourth transistor T4 may be turned-off and the sixth transistor T6 may be turned-on. The fourth transistor T4 may be turned-off and the fifth transistor T5 and sixth transistor T6 may be turned-on, so that the second power voltage VSS may be applied to the GO node GO. Accordingly, the gate output signal G[N] may have the low voltage VGL in the first period TP1.

In the second period TP2, the previous stage gate signal G[N−1] may have the high voltage VGH and the clock signal CLK may have the high level VGH. The second period TP2, a turned-off state of the first transistor T1 may be maintained in response to the clock signal CLK having the high voltage VGH. Accordingly, the gate output signal G[N] may have the low voltage VGL.

In the third period TP3, the previous stage gate output signal G[N−1] may have the high voltage VGH and the clock signal CLK may have the low voltage VGL. In the third period TP3, the previous stage gate output signal G[N−1] having the high voltage VGH may be applied to the Q node Q in response to the clock signal CLK having the low voltage VGL. Accordingly, the voltage of the Q node Q may be high voltage VGH. In response to the voltage of the Q node Q, the second transistor T2 may be turned-off, the third transistor T3 may be turned-on and the fifth transistor T5 may be turned-off. The third transistor T3 may be turned-on, so that the second power voltage VSS may be applied to the QB node QB. In response to the voltage of the QB node QB, the fourth transistor T4 may be turned-on and the sixth transistor T6 may be turned-off. The fourth transistor T4 may be turned-off and the fifth transistor T5 and the sixth transistor T6 may be turned-off, so that the first power voltage VDD1 may be applied to the GO node GO. Accordingly, the gate output signal G[N] may have the high voltage VGH in the third period TP3.

The previous stage gate output signal G[N−1] may have the high voltage VGH in the fourth period TP4, so that the gate output signal G[N] may have the high voltage VGH.

In the fifth period TP5, the previous stage gate output signal G[N−1] may have the low voltage VGL, the clock signal CLK may have the high voltage VGH. The first transistor T1 may be turned-off in response to the clock signal CLK having the high voltage VGH. Accordingly, the gate output signal G[N] may have the high voltage VGH in the fifth period TP5.

In the sixth period TP6, the previous stage gate output signal G[N−1] may have the low voltage VGL, the clock signal CLK may have the low voltage VGL. In the sixth period TP6, the previous stage output signal G[N−1] having the low voltage VGL may be applied to the Q node Q in response to the clock signal CLK having the low voltage VGL. Accordingly, the voltage of the Q node Q may be the low voltage VGL. In response to the voltage of the Q node Q, the second transistor T2 may be turned-on, the third transistor T3 may be turned-off and the fifth transistor T5 may be turned-on. The second transistor T2 may be turned-on, so that the first power voltage VDD1 may be applied to the QB node QB. In response to the voltage of the QB node QB, the fourth transistor T4 may be turned-off and the sixth transistor T6 may be turned-on. The fourth transistor T4 may be turned-off and the fifth transistor T5 and sixth transistor T6 may be turned-on, so that the second power voltage VSS may be applied to the GO node GO. Accordingly, the gate output signal G[N] may have the low voltage VGL in the sixth period TP6.

In a case that the conventional gate driver is operated in the low frame rate mode, a gate output signal of the conventional gate driver may be inaccurate in the sixth period TP6 due to leakage current of transistors. In contrast, the gate driver 300 according to an embodiment may include the sixth transistor T6. The sixth transistor T6 may be N-type transistor. The sixth transistor T6 may be N-type transistor, so that the gate output signal G[N] may be stably outputted in the sixth period TP6.

In an embodiment, a ratio of a channel width to a channel length (W/L) of the sixth transistor T6 may be different from a ratio of a channel width to a channel length (W/L) of the fifth transistor T5. For example, an on-resistance of the sixth transistor T6 may be less than an on-resistance of the fifth transistor T5. Generally, an on-resistance of a transistor may refer to as a resistance that is the transistor having turned-on state. Additionally, the channel length of the sixth transistor T6 may be longer than the channel length of the fifth transistor T5. The channel width of the sixth transistor T6 may be narrower than the channel width of the fifth transistor T5.

The on-resistance of the sixth transistor T6 may be less than the on-resistance of the fifth transistor T5, so that a current may preferentially flows through the fifth transistor T5 in the sixth period TP6. Accordingly, in a case that the voltage of the GO node GO becomes a voltage obtained by subtracting a threshold voltage of the fifth transistor T5 from the low voltage VGL, the fifth transistor T5 may be turned-off. The fifth transistor T5 may be turned-off, so that a resistance of the fifth transistor T5 may be greater. The resistance of the fifth transistor T5 may be greater, so that the current may flow through the sixth transistor T6. The current may flow through the sixth transistor T6, so that the voltage of the GO node GO may be the low voltage VGL.

The on-resistance of the sixth transistor T6 is less than the on-resistance of the fifth transistor T5, the current flowing through the sixth transistor T6 may be decreased in the sixth period TP6. Accordingly, the stress applied to the sixth transistor T6 may be reduced. Accordingly, the reliability and the stability of the gate driver 300 may be improved.

Figure 4:
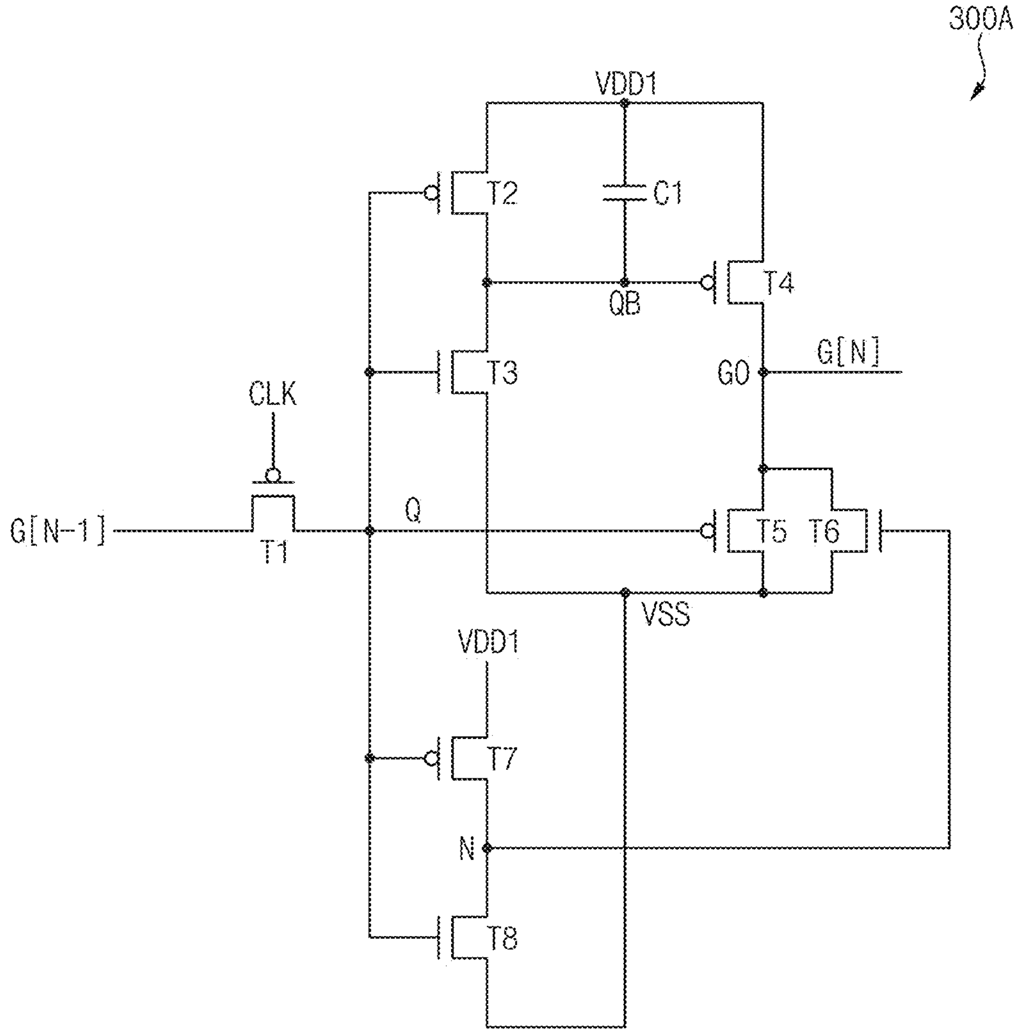
FIG. 4 is a schematic diagram illustrating a gate driver according to an embodiment.

FIG. 4 is a circuit diagram illustrating a gate driver 300A according to an embodiment.

A gate driver 300A is substantially same as the gate driver 300 of FIG. 2 except that the gate driver 300A further includes a seventh transistor T7 and an eighth transistor T8 and the control electrode of the sixth transistor T6 may be connected to not the QB node but an N node N, so that the same reference numerals will be used to refer to the same and any repetitive explanation concerning the above elements will be omitted for sake of brevity.

Referring to FIG. 3 and FIG. 4, in the present embodiment, the gate driver 300A may further include a seventh transistor T7 that includes a control electrode connected to the Q node Q, a first electrode receiving the first power voltage VDD and a second electrode connected to the N node N and the eighth transistor T8 that includes a control electrode connected to the Q node Q, a first electrode connected to the N node N and a second electrode receiving the second power voltage VSS.

In an embodiment, the seventh transistor T7 may apply to the first power voltage VDD1 to the N node N in response to the voltage of the Q node Q. The eighth transistor T8 may apply to the second power voltage VSS to the N node N in response to the voltage of the Q node Q.

In the first period TP1, the previous stage output signal G[N−1] may have the low voltage VGL and the clock signal CLK may have the low voltage VGL. In the first period TP1, the previous stage output signal G[N−1] having the low voltage VGL may applied to the Q node Q in response to the clock signal CLK having the low voltage VGL. Accordingly, the voltage of the Q node Q may be the low voltage VGL. In response to the voltage of the Q node Q, the second transistor T2 may be turned-on, the third transistor T3 may be turned-off, the fifth transistor T5 may be turned-on, the seventh transistor T7 may be turned-on and the eighth transistor T8 may be turned-off. The seventh transistor T7 may be turned-on, so that the first power voltage VDD1 may be applied to the N node N. The second transistor T2 may be turned-on, so that the first power voltage VDD1 may be applied to the QB node QB. In response to the voltage of the QB node QB, the fourth transistor T4 may be turned-off. The sixth transistor T6 may be turned-on in response to a voltage of the N node N having the high voltage VGH. The fourth transistor T4 may be turned-off and the fifth transistor T5 and sixth transistor T6 may be turned-on, so that the second power voltage VSS may be applied to the GO node GO. Accordingly, the gate output signal G[N] may have the low voltage VGL in the first period TP1.

In the second period TP2, the previous stage gate signal G[N−1] may have the high voltage VGH and the clock signal CLK may have the high level VGH. The second period TP2, the turned-off state of the first transistor T1 may be maintained in response to the clock signal CLK having the high voltage VGH. Accordingly, the gate output signal G[N] may have the low voltage VGL.

In the third period TP3, the previous stage gate output signal G[N−1] may have the high voltage VGH and the clock signal CLK may have the low voltage VGL. In the third period TP3, the previous stage gate output signal G[N−1] having the high voltage VGH may be applied to the Q node Q in response to the clock signal CLK having the low voltage VGL. Accordingly, the voltage of the Q node Q may be high voltage VGH. In response to the voltage of the Q node Q, the second transistor T2 may be turned-off, the third transistor T3 may be turned-on, the fifth transistor T5 may be turned-off, the seventh transistor T7 may be turned-off and the eighth transistor T8 may be turned-on. The seventh transistor T7 may be turned-off and the eighth transistor T8 may be turned-on, so that the second power voltage VSS may be applied to the N node N. The sixth transistor T6 may be turned-off in response to the N node having the second power voltage VSS. The third transistor T3 may be turned-on, so that the second power voltage VSS may be applied to the QB node QB. In response to the voltage of the QB node QB, the fourth transistor T4 may be turned-on. The fourth transistor T4 may be turned-off and the fifth transistor T5 and the sixth transistor T6 may be turned-off, so that the first power voltage VDD1 may be applied to the GO node GO. Accordingly, the gate output signal G[N] may have the high voltage VGH in the third period TP3.

The previous stage gate output signal G[N−1] may have the high voltage VGH in the fourth period TP4, so that the gate output signal G[N] may have the high voltage VGH.

In the fifth period TP5, the previous stage gate output signal G[N−1] may have the low voltage VGL, the clock signal CLK may have the high voltage VGH. The first transistor T1 may be turned-off in response to the clock signal CLK having the high voltage VGH. Accordingly, the gate output signal G[N] may have the high voltage VGH in the fifth period TP5.

In the sixth period TP6, the previous stage gate output signal G[N−1] may have the low voltage VGL, the clock signal CLK may have the low voltage VGL. In the sixth period TP6, the previous stage output signal G[N−1] having the low voltage VGL may be applied to the Q node Q in response to the clock signal CLK having the low voltage VGL. Accordingly, the voltage of the Q node Q may be the low voltage VGL. In response to the voltage of the Q node Q, the second transistor T2 may be turned-on, the third transistor T3 may be turned-off, the fifth transistor T5 may be turned-on, the seventh transistor T7 may be turned-on and the eighth transistor T8 may be turned-off. The seventh transistor T7 may be turned-on, so that the first power voltage VDD1 may be applied to the N node N. The second transistor T2 may be turned-on, so that the first power voltage VDD1 may be applied to the QB node QB. In response to the voltage of the QB node QB, the fourth transistor T4 may be turned-off and the sixth transistor T6 may be turned-on. The fourth transistor T4 may be turned-off and the fifth transistor T5 and sixth transistor T6 may be turned-on, so that the second power voltage VSS may be applied to the GO node GO. Accordingly, the gate output signal G[N] may have the low voltage VGL in the sixth period TP6.

In a case that the conventional gate driver is operated in the low frame rate mode, a gate output signal of the conventional gate driver may be inaccurate in the sixth period TP6 due to leakage current of transistors. In contrast, the gate driver 300 according to an embodiment may include the sixth transistor T6. The sixth transistor T6 may be N-type transistor. The sixth transistor T6 may be N-type transistor, so that the gate output signal G[N] may be stably output in the sixth period TP6.

Figure 5:
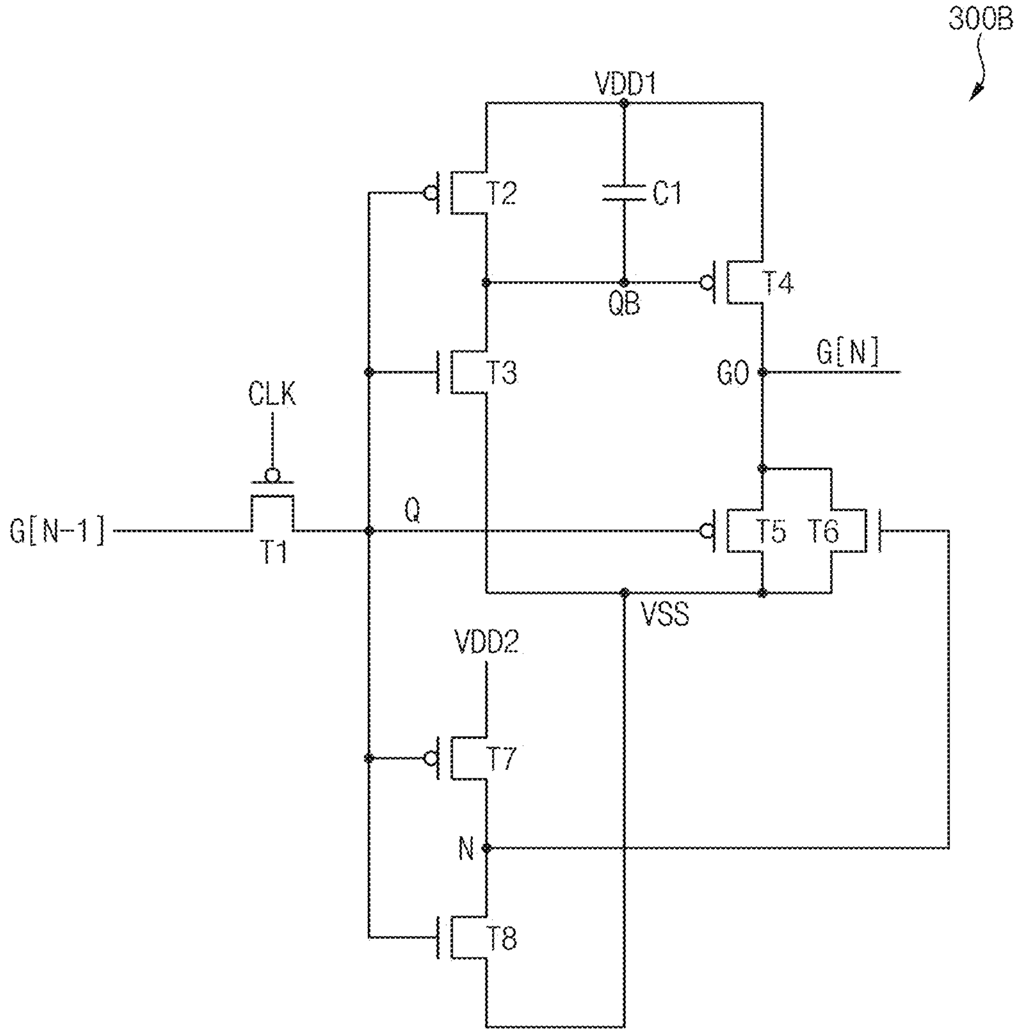
FIG. 5 is a schematic diagram illustrating a gate driver according to an embodiment.

FIG. 5 is a circuit diagram illustrating a gate driver 300B according to an embodiment.

A gate driver 300B is substantially same as the gate driver 300A of FIG. 4 except that the first electrode of the seventh transistor T7 receives a third power voltage VDD2 rather than the first power voltage VDD1, so that the same reference numerals will be used to refer to the same and any repetitive explanation concerning the above elements will be omitted for sake of brevity.

Referring to FIG. 5, the first electrode of the seventh transistor T7 included in the gate driver 300B may receive the third power voltage VDD2 rather than the first power voltage VDD1.

In an embodiment, the third power voltage VDD2 may be lower than the first power voltage VDD1. For example, the third power voltage VDD2 may be lower than the high voltage VGH.

The third power voltage VDD2 may be lower than the high voltage VGH, so that the control electrode of the sixth transistor T6 may receive a voltage lower than the high voltage VGH. Accordingly, a stress applied to the sixth transistor T6 may be reduced. Accordingly, the stability and the reliability of the gate driver 300B may be further improved.

Figure 6:
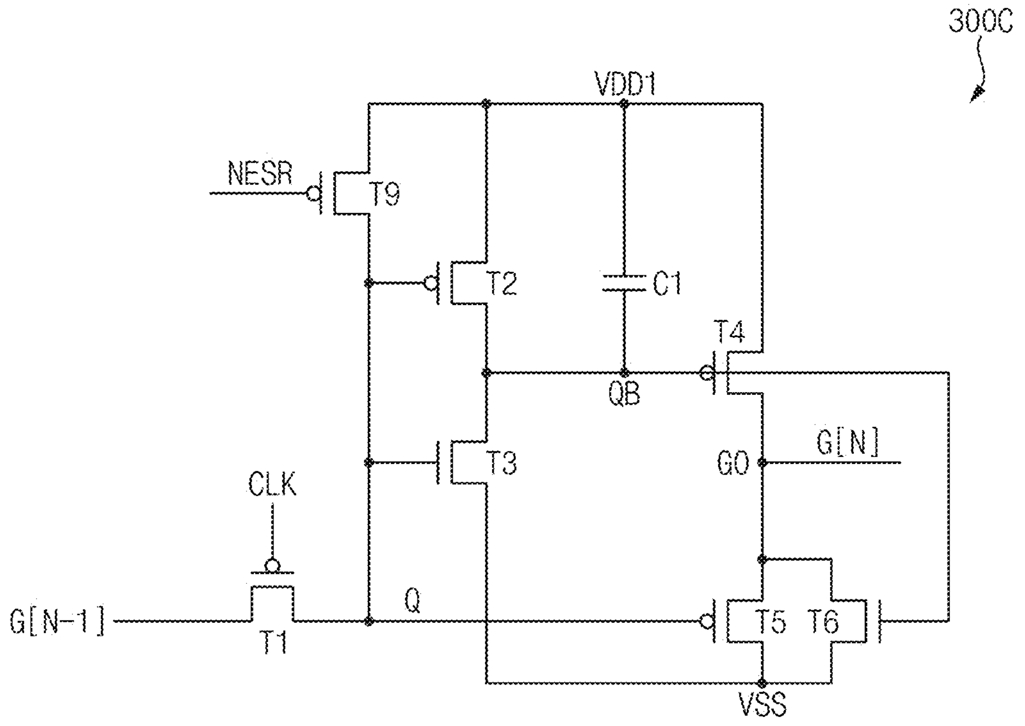
FIG. 6 is a schematic diagram illustrating a gate driver according to an embodiment.

FIG. 6 is a circuit diagram illustrating a gate driver 300C according to an embodiment.

A gate driver 300C is substantially same as the gate driver 300 of FIG. 2 except that the gate driver 300C further includes a ninth transistor T9, so that the same reference numerals will be used to refer to the same and any repetitive explanation concerning the above elements will be omitted for sake of brevity.

Referring to FIG. 6, the gate driver 300C may further include the ninth transistor T9 that includes a control electrode receiving an initialization signal NESR, a first electrode receiving the first power voltage VDD1 and a second electrode connected to the Q node Q.

In an embodiment, in a case that the initialization signal NESR has an activation level, the first power voltage VDD1 may be applied to the Q node Q. Accordingly, in a case that the initialization signal NESR has the activation level, the gate output signal G[N] of the gate driver 300C may have the high voltage VGH.

In an embodiment, the initialization signal NESR may be a global signal applied to all stages of the gate driver 300C.

Accordingly, the gate output signals G[N] of the all stages of the gate driver 300C may have the high voltage VGH.

Figure 7:
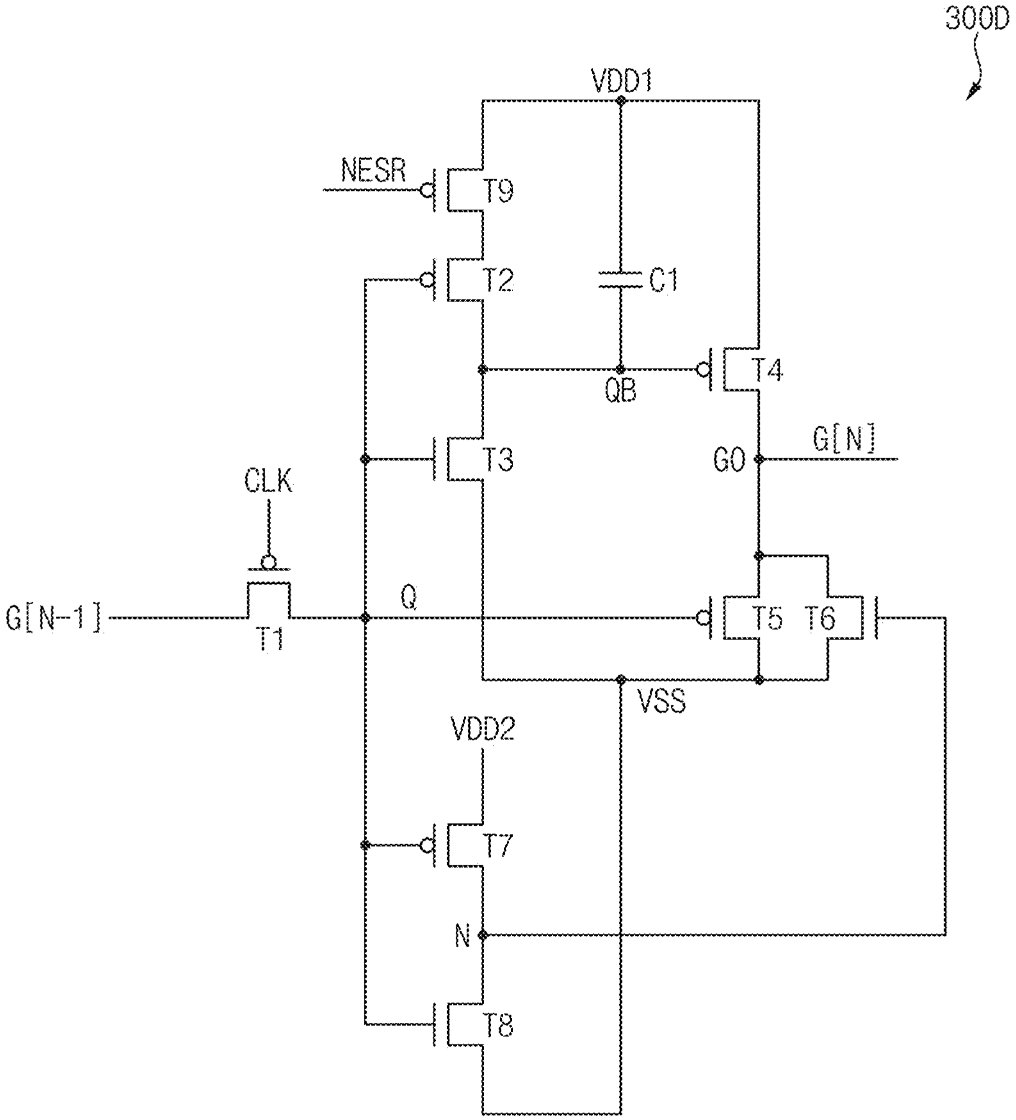
FIG. 7 is a schematic diagram illustrating a gate driver according to an embodiment.

FIG. 7 is a circuit diagram illustrating a gate driver 300D according to an embodiment.

A gate driver 300D is substantially same as the gate driver 300B of FIG. 5 except that the gate driver 300D further includes a ninth transistor T9, so that the same reference numerals will be used to refer to the same and any repetitive explanation concerning the above elements will be omitted for sake of brevity.

Referring to FIG. 7, the gate driver 300D may further include the ninth transistor T9 that includes a control electrode receiving an initialization signal NESR, a first electrode receiving the first power voltage VDD1 and a second electrode connected to the Q node Q.

In an embodiment, in a case that the initialization signal NESR has the activation level, the first power voltage VDD1 may be applied to the Q node Q. Accordingly, in a case that the initialization signal NESR has the activation level, the gate output signal G[N] of the gate driver 300D may have the high voltage VGH.

In an embodiment, the initialization signal NESR may be a global signal applied to all stages of the gate driver 300D. Accordingly, the gate output signals G[N] of the all stages of the gate driver 300D may have the high voltage VGH.

Figure 8:
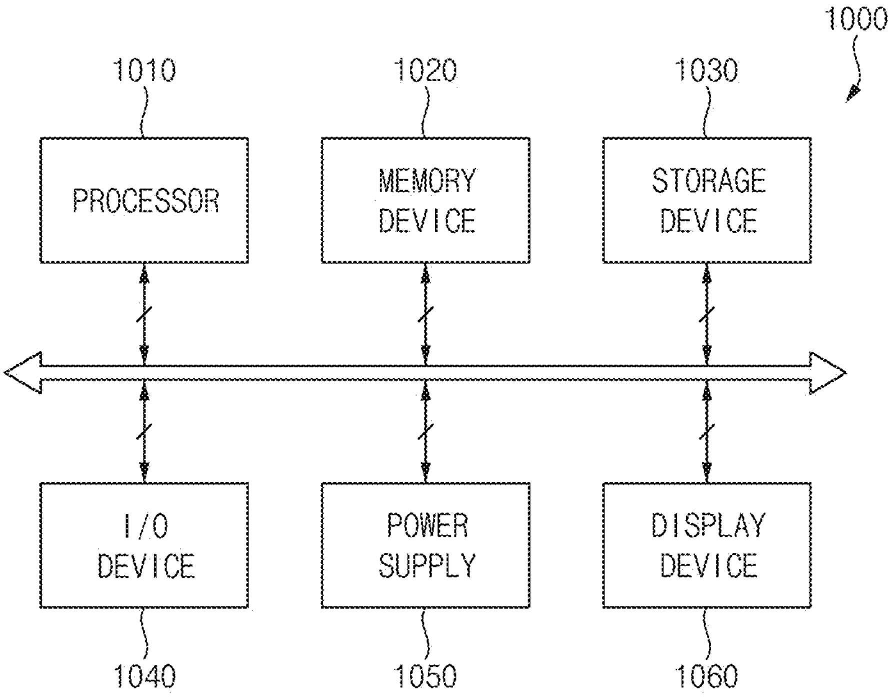
FIG. 8 is a block diagram illustrating an electronic apparatus according to an embodiment.
Figure 9:
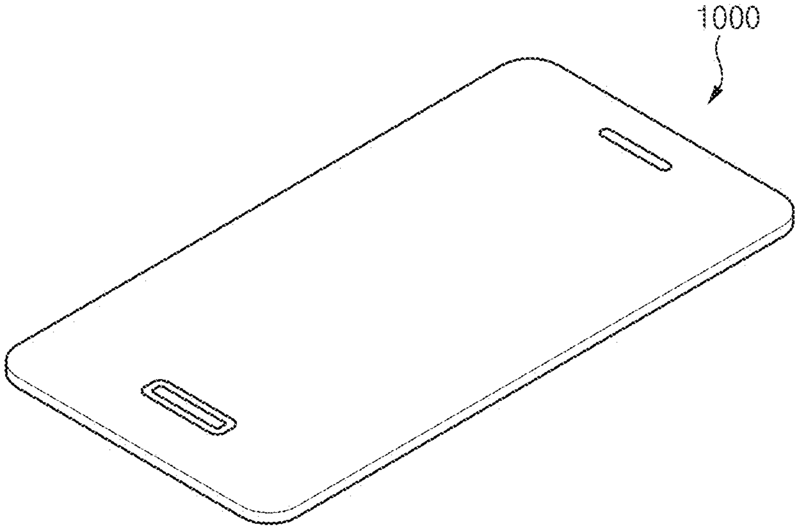
FIG. 9 is a view illustrating an example in which the electronic apparatus of FIG. 8 is implemented as a smart phone.

FIG. 8 is a block diagram illustrating an electronic apparatus 1000 according to an embodiment. FIG. 9 is a view illustrating an example in which the electronic apparatus of FIG. 8 is implemented as a smart phone.

Referring to FIGS. 8 and 9, the electronic apparatus 1000 may include a processor 1010, a memory device 1020, a storage device 1030, an input/output (I/O) device 1040, a power supply 1050 and a display device 1060. The display device 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

According to an embodiment, as shown in FIG. 9, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device and the like.

The processor 1010 may perform various computing functions or various tasks. The processor 1010 may be a micro-processor, a central processing unit (CPU), an application processor (AP) and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device and the like and/or at least one volatile memory device such as a dynamic random access memory (DRAM) device, a static random access memory (SRAM) device, a mobile DRAM device and the like.

The storage device 1030 may include a solid state drive (SSD) device, a hard disk drive (HDD) device, a CD-ROM device and the like. The I/O device 1040 may include an input device such as a keyboard, a keypad, a mouse device, a touch-pad, a touch-screen and the like and an output device such as a printer, a speaker and the like. In some embodiments, the display device 1060 may be included in the I/O device 1040. The power supply 1050 may provide power for operations of the electronic apparatus 1000. The display device 1060 may be coupled to other components via the buses or other communication links.

According to a gate driver and a display apparatus including the gate driver, the display apparatus that stably outputs the gate output signal may be provided.

The foregoing is illustrative of the present inventive concept and is not to be construed as limiting thereof. Although several embodiments have been described, those skilled in the art will readily appreciate that many modifications are possible in the embodiments without materially departing from the novel teachings and advantages of the disclosure. Accordingly, all such modifications are intended to be included within the spirit and scope of the disclosure as defined in the claims. It is to be understood that the foregoing is illustrative of the present inventive concept and is not to be construed as limited to the specific embodiments disclosed and that modifications to the disclosed embodiments, as well as other embodiments, are intended to be included within the scope of the appended claims. The disclosure is defined by the following claims, with equivalents of the claims to be included therein.

What is claimed is:

1. A gate driver comprising a plurality of stages, wherein at least one stage of the plurality of stages comprises:

a first transistor including a control electrode configured to receive a clock signal, a first electrode configured to receive a previous stage gate output signal, and a second electrode electrically connected to a Q node;

a second transistor including a control electrode electrically connected to the Q node, a first electrode configured to receive a first power voltage, and a second electrode electrically connected to a QB node;

a third transistor including a control electrode electrically connected to the Q node, a first electrode electrically connected to the QB node, and a second electrode configured to receive a second power voltage;

a fourth transistor including a control electrode electrically connected to the QB node, a first electrode configured to receive the first power voltage, and a second electrode electrically connected to a GO node outputting a gate output signal;

a fifth transistor including a control electrode electrically connected to the Q node, a first electrode electrically connected to the GO node, and a second electrode configured to receive the second power voltage;

a sixth transistor including a first electrode electrically connected to the GO node and a second electrode configured to receive the second power voltage; and a first capacitor including a first electrode configured to receive the first power voltage and a second electrode electrically connected to the QB node.

2. The gate driver of claim 1, wherein the sixth transistor is an N-type transistor, and the fifth transistor is a P-type transistor.

3. The gate driver of claim 2, wherein the sixth transistor further comprises a control electrode electrically connected to the QB node.

4. The gate driver of claim 3, wherein a ratio of a channel width to a channel length of the fifth transistor is different from a ratio of a channel width to a channel length of the sixth transistor.

5. The gate driver of claim 4, wherein the channel length of the sixth transistor is longer than the channel length of the fifth transistor.

6. The gate driver of claim 4, wherein the channel width of the sixth transistor is narrower than the channel width of the fifth transistor.

7. The gate driver of claim 3, wherein, in a case that the gate output signal has a low voltage, a turned-on state of the sixth transistor is maintained.

8. The gate driver of claim 3, wherein the least one stage further comprises a ninth transistor including a control electrode configured to receive an initialization signal, a first electrode configured to receive the first power voltage, and a second electrode electrically connected to the Q node.

9. The gate driver of claim 2, wherein the least one stage further comprises:

a seventh transistor including a control electrode electrically connected to the Q node, a first electrode configured to receive a third power voltage, and a second electrode electrically connected to an N node; and an eighth transistor including a control electrode electrically connected to the Q node, a first electrode electrically connected to the N node, and a second electrode configured to receive the second power voltage, wherein the sixth transistor further comprises a control electrode electrically connected to the N node.

10. The gate driver of claim 9, wherein in a case that the gate output signal has a low voltage, a turned-on state of the sixth transistor is maintained.

11. The gate driver of claim 9, wherein the third power voltage is lower than the first power voltage.

12. The gate driver of claim 9, wherein the least one stage further comprises a ninth transistor including a control electrode configured to receive an initialization signal, a first electrode configured to receive the first power voltage, and a second electrode electrically connected to the Q node.

13. A gate driver comprising a plurality of stages, wherein at least one stage of the plurality of stages comprises:

a first transistor configured to apply a previous stage gate output signal to a Q node in response to a clock signal;

a second transistor configured to apply a first power voltage to a QB node in response to a voltage of the Q node;

a third transistor configured to apply a second power voltage to the QB node in response to the voltage of the Q node;

a fourth transistor configured to apply the first power voltage to a GO node in response to a voltage of the QB node;

a fifth transistor configured to apply the second power voltage to the GO node in response to the voltage of the Q node; and a sixth transistor configured to apply the second power voltage to the GO node, wherein the least one stage outputs a voltage of the GO node as a gate output signal, and the sixth transistor is an N-type transistor.

14. The gate driver of claim 13, wherein the sixth transistor applies the second power voltage to the GO node in response to the voltage of the QB node.

15. The gate driver of claim 14, wherein a ratio of a channel width to a channel length of the fifth transistor is different from a ratio of a channel width to a channel length of the sixth transistor.

16. The gate driver of claim 13, wherein the least one stage further comprises:

a seventh transistor configured to apply a third power voltage lower than the first power voltage to an N node in response to the voltage of the Q node; and an eighth transistor configured to apply the second power voltage to the N node in response to the voltage of the Q node, and the sixth transistor applies the second power voltage to the GO node in response to a voltage of the N node.

17. The gate driver of claim 13, wherein the least one stage further comprises a ninth transistor configured to apply the first power voltage to the Q node in response to an initialization signal.

18. The gate driver of claim 13, wherein, in a case that the gate output signal has a low voltage, a turned-on state of the sixth transistor is maintained.

19. A display apparatus comprising:

a display panel;

a gate driver configured to apply a gate output signal to a gate line of the display panel and including a plurality of stages; and a data driver configured to apply a data voltage to a data line of the display panel, wherein at least one stage of the plurality of stages comprises:

a first transistor including a control electrode configured to receive a clock signal, a first electrode configured to receive a previous stage gate output signal and a second electrode electrically connected to a Q node;

a second transistor including a control electrode electrically connected to the Q node, a first electrode configured to receive a first power voltage and a second electrode electrically connected to a QB node;

a third transistor including a control electrode electrically connected to the Q node, a first electrode electrically connected to the QB node and a second electrode configured to receive a second power voltage;

a fourth transistor including a control electrode electrically connected to the QB node, a first electrode configured to receive the first power voltage and a second electrode electrically connected to a GO node outputting the gate output signal;

a fifth transistor including a control electrode electrically connected to the Q node, a first electrode electrically connected to the GO node and a second electrode configured to receive the second power voltage;

a sixth transistor including a first electrode electrically connected to the GO node and a second electrode configured to receive the second power voltage; and a first capacitor including a first electrode configured to receive the first power voltage and a second electrode electrically connected to the QB node, and wherein the sixth transistor is an N-type transistor.

20. The display apparatus of claim 19, wherein, in a case that the gate output signal has a low voltage, a turned-on state of the sixth transistor is maintained.

* * * * *